(12) United States Patent
Brandenburger et al.

(10) Patent No.: US 6,762,230 B2
(45) Date of Patent: Jul. 13, 2004

(54) COATING COMPOSITIONS CONTAINING LOW VOC COMPOUNDS

(75) Inventors: Larry B. Brandenburger, Lino Lakes, MN (US); Bruce Sicklesteel, Schaumburg, IL (US); Mary Jane Owens, St. Charles, IL (US)

(73) Assignee: Valspar Sourcing, Inc., Minneapolis, MN (US)

( * ) Notice: Subject to any disclaimer, the term of this patent is extended or adjusted under 35 U.S.C. 154(b) by 245 days.

(21) Appl. No.: 10/081,351

(22) Filed: Feb. 22, 2002

(65) Prior Publication Data

US 2002/0156163 A1 Oct. 24, 2002

Related U.S. Application Data

(60) Provisional application No. 60/270,680, filed on Feb. 22, 2001.

(51) Int. Cl.$^7$ .............................. C08J 3/00; C08K 5/09; C08K 5/10; C08K 5/11; C08L 31/00
(52) U.S. Cl. ..................... 524/284; 524/300; 524/306; 524/308; 524/310; 524/311; 524/320
(58) Field of Search ............................ 524/284, 300, 524/306, 308, 310, 311, 320

(56) References Cited

U.S. PATENT DOCUMENTS

| | | |
|---|---|---|
| 4,455,402 A | 6/1984 | Amick et al. |
| 4,489,188 A | 12/1984 | Jones et al. |
| 4,525,512 A | 6/1985 | Hudson |
| 4,659,778 A | 4/1987 | Williams |
| 4,789,706 A | 12/1988 | Williams |
| 4,894,406 A | 1/1990 | Smith et al. |
| 4,898,969 A | 2/1990 | Jones et al. |
| 5,047,454 A | 9/1991 | Cowles et al. |
| 5,470,906 A | 11/1995 | Craun et al. |
| 5,587,428 A | 12/1996 | Jones et al. |
| 5,610,263 A | 3/1997 | Jones et al. |
| 5,641,854 A | 6/1997 | Jones et al. |
| 5,756,569 A | 5/1998 | Carver et al. |
| 5,955,550 A | 9/1999 | Jones et al. |
| 6,110,998 A | 8/2000 | Slinkard et al. |
| 6,197,877 B1 * | 3/2001 | Thetford et al. ............ 524/599 |

FOREIGN PATENT DOCUMENTS

| | | |
|---|---|---|
| EP | 0 361 519 A2 | 4/1990 |
| EP | 0 501 614 A2 | 9/1992 |
| EP | 0 599 478 A1 | 6/1994 |
| JP | 08 027064 | 1/1996 |
| WO | WO 94/21368 * | 9/1994 |
| WO | WO 99/32563 | 7/1999 |
| WO | WO 00/44836 | 8/2000 |
| WO | WO 00/56823 | 9/2000 |

OTHER PUBLICATIONS

"Archer CS Non–Volatile Coalescent Solvent," Product Information, ADM, ICE Convention, Chicago, Oct, 2000;(2 pgs.).
Goldberg et al., "Caprolactone Polyols as Reactive Diluents for High–Solids," *Modern Paint and Coatings*, 1992;36–39.
McCreary et al., "Non–HAP Coalescents for Waterborne Emulsion Coatings," *Paint & Coatings Industry*, 1994;70–74.

* cited by examiner

*Primary Examiner*—Patrick D. Niland
(74) *Attorney, Agent, or Firm*—Mueting, Raasch & Gebhardt, P.A.

(57) ABSTRACT

Coating compositions containing coalescents and a latex polymer, wherein the coalescent has a volatile organic content of less than about 50% and is dispersible in the coating composition.

45 Claims, No Drawings

COATING COMPOSITIONS CONTAINING LOW VOC COMPOUNDS

RELATED APPLICATIONS

This application claims the benefit of the U.S. Provisional Application No. 60/270,680, filed 22 Feb. 2001, which is incorporated by reference in its entirety.

BACKGROUND

Coating compositions, such as paints, that include latex polymer particles typically also include a coalescent (i.e., coalescing agent or film-forming agent) in addition to pigments and fillers. The coalescent functions as a solvent as well as a plasticizer for the polymer particles to soften the latex polymer particles and assist in the formation of a continuous coating or film after applying to a surface and allowing to dry.

Useful coalescents are generally stable in the presence of water, compatible with other ingredients typically used in paint formulations, particularly the latex polymers, such that the stability of the latex-based composition is not compromised. They are also typically sufficiently volatile to escape when the applied coating composition is allowed to dry, but sufficiently nonvolatile to evaporate more slowly than other ingredients (e.g., drying retarders, antifreezes) that delay film formation. However, there is a general desire in the industry to reduce volatile organic emissions, thereby reducing the environmental and health concerns.

Governments have established regulations setting forth guidelines relating to volatile organic compounds that may be released into the atmosphere. To reduce the level of volatile organic compounds, new high solids coating compositions have been developed as well as powder coating compositions that do not include volatile compounds, have a reduced concentration of volatile compounds, or incorporate compounds having a lower volatility. Reducing the volatility of coalescents, solvents, plasticizers, etc. can adversely affect the balance of properties needed in a latex-based coating composition, however. Thus, there is a need for coalescents, solvents, plasticizers, etc. that can be used in coating compositions, such as paints, that do not compromise stability, compatibility, film formation ability, or the desirable properties of the applied coating, etc.

SUMMARY

The present invention provides a class of compounds that have a relatively low volatile organic content. Such compounds can be used in coating compositions, preferably paints, as coalescing agents, solvents, plasticizers, etc. A suitable coalescent is dispersible in the coating composition, which is preferably stable over time. Preferably, the compound, when used as a coalescent, facilitates the formation of polymer films of the latex polymer at a temperature of less than about 25° C. (more preferably, at about 4° C. to about 10° C., and most preferably, at about 4° C. to about 5° C.). Thus, there is provided a coating composition that includes a latex polymer and a coalescent (which can also function as a solvent or a plasticizer). Such coating compositions can be coated onto a substrate and dried, as with a paint, for example.

In one embodiment, a coating composition (preferably, a paint) includes: a latex polymer; and a coalescent having the formula: $R^1$—(C(O)—$X_r$—O)$_n$—$R^2$ wherein: $R^1$ is an organic group (preferably, having less than 100 carbon atoms); X is a divalent organic group (preferably, having 2 to 8 carbon atoms, and more preferably, 3 to 5 carbon atoms); r is 0 to 1; n is 1 to 10 (preferably, n is 1 to 5, more preferably, n is 1 to 3, and most preferably, n is 2 to 3); and $R^2$ is hydrogen or an organic group (preferably, having less than 100 carbon atoms); with the proviso that $R^1$ includes at least three carbon atoms when X is not —(CH$_2$)$_s$— wherein s is 2 to 8; with the proviso that the coalescent has less than two aliphatic unsaturated carbon-carbon bonds when r is zero (preferably, the coalescent does not include aliphatic unsaturated carbon-carbon bonds when r is zero, and more preferably, the coalescent does not include aliphatic unsaturated carbon-carbon bonds); wherein the coalescent has a volatile organic content of less than about 50% (preferably, less than about 30%, more preferably, less than about 20%, and most preferably, less than about 15%) and is dispersible in the coating composition. Preferably, r is one.

In another embodiment, a coating composition includes: a latex polymer; and a coalescent having the formula: $R^1$—(C(O)—$X_r$—O)$_n$—$R^2$ wherein: $R^1$ is an organic group; X is a divalent organic group; r is 0 to 1; n is 1 to 10; and $R^2$ is hydrogen or an organic group; with the proviso that $R^1$ includes at least three carbon atoms when X is not —(CH$_2$)$_s$— wherein s is 2 to 8; with the proviso that the coalescent does not include aliphatic unsaturated carbon-carbon bonds; with the proviso that r is one when $R^2$ is H; wherein the coalescent has a volatile organic content of less than about 50%, is dispersible in the coating composition, and facilitates the formation of polymer films of the latex polymer at a temperature of less than about 25° C. (preferably, at a temperature of about 4° C. to about 10° C., and more preferably, at a temperature of about 4° C. to about 5° C.).

In another embodiment, a coating composition includes: a latex polymer; and a coalescent having the formula: $R^1$—(C(O)—$X_r$—O)$_n$—$R^2$ wherein: $R^1$ has the formula $R^3$—(CH$_2$)$_m$—(O(CH$_2$)$_p$)$_q$— wherein $R^3$ is an alkyl or aryl group, m is 0 to 24, p is 1 to 4, and q is 0 to 50; X has the formula —(CH$_2$)$_s$—, wherein s is 2 to 8; r is 0 to 1; n is 1 to 10; and $R^2$ is hydrogen or $R^1$; wherein the coalescent has a volatile organic content of less than about 50%, is dispersible in the coating composition, and facilitates the formation of polymer films of the latex polymer at a temperature of less than about 25° C. (preferably, at a temperature of about 4° C. to about 10° C., and more preferably, at a temperature of about 4° C. to about 5° C.).

In yet another embodiment, a coating composition includes: a latex polymer; and a coalescent having the formula: $R^1$—(C(O)—X—O)$_n$—H wherein: $R^1$ is a hydrocarbyl moiety or an organic group containing substituents selected from the group of nonperoxidic oxygen atoms, hydroxyl groups, and combinations thereof; X is a divalent hydrocarbyl moiety or an organic group containing nonperoxidic oxygen atoms and carbonyl groups; and n is 1 to 10; wherein the coalescent has a volatile organic content of less than about 50% (preferably, less than about 30%) and is dispersible in the coating composition.

In still another embodiment, a coating composition includes: a latex polymer; and a coalescent having the formula: $R^1$—(C(O)—X—O)$_n$—H wherein: $R^1$ is a hydrocarbyl moiety or an organic group containing substituents selected from the group of nonperoxidic oxygen atoms, hydroxyl groups, and combinations thereof; X has the formula —(CH$_2$)$_s$—, wherein s is 2 to 8; and n is 1 to 10; wherein the coalescent has a volatile organic content of less than about 50% (preferably, less than about 30%) and is dispersible in the coating composition.

In another embodiment, a coating composition includes: a latex polymer; and a coalescent having the formula:

$R^1$—(C(O)—X—O)$_n$—H wherein: $R^1$ is a hydrocarbyl moiety or an organic group containing nonperoxidic oxygens; X is an organic group containing nonperoxidic oxygens and carbonyl groups; and n is 1 to 10; wherein the coalescent has a volatile organic content of less than about 50% (preferably, less than about 30%) and is dispersible in the coating composition.

The present invention also provides methods of coating that include: providing a coating composition as described herein; applying the coating composition to a substrate (e.g., wall); and allowing the coating composition to dry.

DEFINITIONS

The term "dispersible" in the context of a dispersible coalescent means that the coalescent can be mixed into the coating composition to form a uniform mixture without the use of high shear mixing.

The term "stable" in the context of a coating composition containing a dispersible coalescent means that the coalescent does not phase separate from the coating composition upon standing at 120° F. (49° C.) for four weeks.

The terms "volatile organic content" and "VOC" herein mean the volatility of the compound as measured by ASTM method D2369-90.

The term "organic group" means a hydrocarbon (i.e., hydrocarbyl) group with optional elements other than carbon and hydrogen in the chain, such as oxygen, nitrogen, sulfur, and silicon that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated linear or branched hydrocarbon group with one or more carbon-carbon double bonds, such as a vinyl group. The term "alkynyl group" means an unsaturated linear or branched hydrocarbon group with one or more carbon-carbon triple bonds. The term "cyclic group" means a closed ring hydrocarbon group that is classified as an alicyclic group, aromatic group, or heterocyclic group. The term "alicyclic group" means a cyclic hydrocarbon group having properties resembling those of aliphatic groups. The term "aromatic group" or "aryl group" means a mono- or polynuclear aromatic hydrocarbon group. The term "heterocyclic group" means a closed ring hydrocarbon in which one or more of the atoms in the ring is an element other than carbon (e.g., nitrogen, oxygen, sulfur, etc.).

Substitution is anticipated on the organic groups of the coalescents used in the coating compositions of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. The term "hydrocarbyl moiety" refers to unsubstituted organic moieties containing only hydrogen and carbon.

DETAILED DESCRIPTION OF PREFERRED EMBODIMENTS

The present invention is directed to coating compositions that include coalescents, which can optionally also function as plasticizers and/or solvents, and coatings prepared therefrom. Preferably, the coating compositions are in the form of paints. Preferably, such coating compositions include a polymer, preferably, a latex polymer, in addition to one or more coalescents. The coalescent is dispersible in the coating composition which is preferably stable over time (i.e., the coalescent does not phase separate from the coating composition upon standing at 49° C. for four weeks).

The coating compositions of the present invention are advantageous in that they have a relatively low volatile organic content without sacrificing the balance of properties desired for an applied (i.e., dry) coating, such as a paint. For example, the coating compositions of the present invention provide an applied coating having a preferred scrub resistance, as determined by the test set forth in the Examples Section herein below, of at least about that of TEXANOL, which is an alcohol/ester made from trimethylpentane diol and isobutyric acid (($H_3C$)$_2$—CH—C(O)—O—$CH_2$—C($CH_3$)$_2$—$CH_2$(OH)—CH($CH_3$)$_2$).

Preferably, the coating compositions include a compound having a relatively low volatile organic content (VOC), and more preferably, a relatively low molecular weight. Typically, the volatile organic content, as determined by the test set forth in the Examples Section herein below, is no greater than about 50%, preferably, no greater than about 30%, more preferably, no greater than about 20%, and most preferably, no greater than about 15%, based on the original weight of the coalesent. Preferably, the number average molecular weight of such compounds is no greater than about 750, and more preferably, less than about 500.

Preferably, such compounds are good coalescents. That is, they preferably and advantageously provide good film forming properties for a latex polymer. More preferably, a particularly desirable group of compounds are those that provide good film forming properties at low temperatures (e.g., below room temperature), as determined by the test set forth in the Examples Section herein below. Preferably, such compounds facilitate the formation of polymer films of a latex polymer at a temperature of less than about 25° C. (more preferably, at a temperature of about 4° C. to about 10° C., and most preferably, at a temperature of about 4° C. to about 5° C.).

Preferably, such low VOC compounds are of the formula $R^1$—(C(O)—X$_r$—O)$_n$—$R^2$ wherein: n is 1 to 10; $R^1$ is an organic group, preferably, having less than 100 carbon atoms, and more preferably, having 3 to 24 carbon atoms; $R^2$ is hydrogen or an organic group, preferably, having less than 100 carbon atoms; and X is a divalent organic group, preferably, having 2 to 8 carbon atoms, and more preferably, 3 to 5 carbon atoms; and r is 0 to 1. Preferably, n is 1 to 5, more preferably, n is 1 to 3, and most preferably, n is 2 to 3.

Preferably, $R^1$ is a hydrocarbyl moiety, although for certain preferred embodiments $R^1$ is an organic group that includes substituents selected from the group of nonperoxidic oxygen atoms, carbonyl groups, hydroxyl groups, and combinations thereof, more preferably, substituents selected from the group of nonperoxidic oxygen atoms, hydroxyl groups, and combinations thereof, and most preferably, nonperoxidic oxygen atoms. For certain embodiments, $R^1$ has the formula $R^3$—$(CH_2)_m$—$(O(CH_2)_p)_q$— wherein $R^3$ is an alkyl or aryl group, m is 0 to 24, p is 1 to 4 (preferably, p is 1 to 2), and q is 0 to 50. In this preferred formulation for $R^1$, m+pq is preferably less than about 23.

Preferably, X is a divalent hydrocarbyl moiety, although for certain preferred embodiments, X is an organic group that includes substituents selected from the group of non-peroxidic oxygen atoms, carbonyl groups, and combinations thereof, and more preferably, nonperoxidic oxygen atoms and carbonyl groups. For certain embodiments, X has the formula —$(CH_2)_s$— wherein s is 2 to 8, and preferably, s is 3 to 5.

Preferably, $R^2$ is hydrogen, although for certain preferred embodiments $R^2$ is $R^1$ as defined above. For certain embodiments, r is one, preferably when $R^2$ is hydrogen.

For certain embodiments, $R^1$ includes at least three carbon atoms when X is not —$(CH_2)_s$— wherein s is 2 to 8; and $R^1$ and $R^2$ together (i.e., the coating composition) include less than two aliphatic unsaturated carbon-carbon bonds when r is zero, preferably, $R^1$ and $R^2$ together (i.e., the coating composition) do not include any aliphatic unsaturated carbon-carbon bonds when r is zero, and more preferably, $R^1$ and $R^2$ together (i.e., the coating composition) do not include any aliphatic unsaturated carbon-carbon bonds.

For certain embodiments, $R^1$ is an organic group having 3 to 24 carbon atoms and substituents selected from the group of oxygen atoms, carbonyl groups, hydroxyl groups, and combinations thereof; and $R^2$ is hydrogen.

A preferred group of such compounds have the formula: $R^1$—$(C(O)$—$X_r$—$O)_n$—$R^2$ wherein: $R^1$ is an organic group; X is a divalent organic group; r is 0 to 1; n is 1 to 10; and $R^2$ is hydrogen or an organic group; with the proviso that $R^1$ includes at least three carbon atoms when X is not —$(CH_2)_s$— wherein s is 2 to 8; with the proviso that the coalescent has less than two aliphatic unsaturated carbon-carbon bonds when r is zero. Such compounds can be made from caprolactone and an alcohol, for example.

Another preferred group of such compounds have the formula: $R^1$—$(C(O)$—$X_r$—$O)_n$—$R^2$ wherein: $R^1$ is an organic group; X is a divalent organic group; r is 0 to 1; n is 1 to 10; and $R^2$ is hydrogen or an organic group; with the proviso that $R^1$ includes at least three carbon atoms when X is not —$(CH_2)_s$—wherein s is 2 to 8; with the proviso that the coalescent does not include aliphatic unsaturated carbon-carbon bonds; with the proviso that r is one when $R^2$ is hydrogen.

Another preferred group of such compounds have the formula: $R^1$—$(C(O)$—$X_r$—$O)_n$—$R^2$ wherein: $R^1$ has the formula $R^3$—$(CH_2)_m$—$(O(CH_2)_p)_q$— wherein $R^3$ is an alkyl or aryl group, m is 0 to 24, p is 1 to 4, and q is 0 to 50; X has the formula —$(CH_2)_s$—, wherein s is 2 to 8; r is 0 to 1; n is 1 to 10; and $R^2$ is hydrogen or $R^1$.

Another preferred group of such compounds have the formula: $R^1$—$(C(O)$—$X$—$O)_n$—H wherein: $R^1$ is a hydrocarbyl moiety or an organic group containing substituents selected from the group of nonperoxidic oxygen atoms, hydroxyl groups, and combinations thereof; X is a divalent hydrocarbyl moiety or an organic group containing nonperoxidic oxygen atoms and carbonyl groups; and n is 1 to 10. Such compounds can be made from a glycidyl ester of neodecanoic acid (e.g. CARDURA E10) and a carboxylic acid, for example.

Another preferred group of such compounds have the formula: $R^1$—$(C(O)$—$X$—$O)_n$—H wherein: $R^1$ is a hydrocarbyl moiety or an organic group containing substituents selected from the group of nonperoxidic oxygen atoms, hydroxyl groups, and combinations thereof; X has the formula —$(CH_2)_s$—, wherein s is 2 to 8; and n is 1 to 10.

Another preferred group of such compounds have the formula: $R^1$—$(C(O)$—$X$—$O)_n$—H wherein: $R^1$ is a hydrocarbyl moiety or an organic group containing nonperoxidic oxygens; X is an organic group containing nonperoxidic oxygens and carbonyl groups; and n is 1 to 10.

These compounds can be formed using standard organic synthesis techniques, which are well known to one of skill in the art. Specific syntheses are set forth in the Examples Section herein below.

The preferred polymers of the coating compositions of the present invention include latex polymers (i.e., latices). These are well known in the paint art and are typically particles emulsified or suspended in an aqueous medium. They include, for example, the polymerization products of ethylenically unsaturated monomers, such as alkyl and alkoxy acrylates or methacrylates, vinyl esters of saturated carboxylic acids, monoolefins, conjugated dienes, optionally with one or more monomers, such as, for example, styrene, methyl methacrylate, butyl acrylate, 2-ethylhexyl acrylate, vinyl acetate, acrylonitrile, and vinyl chloride. The latex polymers can have a wide range of glass transition temperatures, depending on the desired properties of the resultant coating.

The amount of polymers and the low VOC compounds (e.g., coalescents) present in the coating compositions of the present invention include an amount that provides the desired result. Preferably, one or more relatively low VOC compounds, which preferably function as coalescents, are present in a coating composition in an amount of at least about 1 percent by weight (wt-%), more preferably, at least about 2 wt-%, and most preferably, at least about 5 wt-%, based on polymer solids. Preferably, one or more relatively low VOC compounds are present in a coating composition in an amount of no greater than about 50 wt-%, and more preferably, no greater than about 25 wt-%, based on polymer solids. When mixtures of such coalescents are used, the numerical values of the variables in the formulas described herein are averages.

Other components of the coating compositions of the present invention include those typically used in paint formulations, such as pigments, fillers, thickeners, biocides, mildewcides, surfactants, dispersants, defoamers, and the like. The coating compositions can be made using standard techniques known in the paint industry.

EXAMPLES

The following examples are offered to aid in understanding of the present invention and are not to be construed as limiting the scope thereof. Unless otherwise indicated, all parts and percentages are by weight.

VOC Testing:

Testing of coalescents were performed using ASTM method D2369-90. Approximately 0.5 gram (g) of coalescent was weighed into an aluminum weighing dish and placed in a forced air oven at 110° C. for 1 hour. The dish was then reweighed and the mass lost represents the percent (%) VOC of the coalescent.

Scrub Resistance:

The coating was drawn down on a black vinyl scrub test chart (available from the Leneta Company) with a standard 3-mil (0.0762 millimeter (mm)) Bird film applicator (available from Byk Gardner). The film was allowed to dry at room temperature for 7 days. Scrub resistance was measured with a Gardner Abrasion Tester (available from Byk Gardner) using 10 g of scrub media. The number of cycles until the coating film was first removed was recorded.

Low Temperature Coalescence (LTC):

The coating was drawn down on a Penopac paper chart (available from the Leneta Company) with a standard 3-mil Bird film applicator. The chart was then put in the refrigerator at 40° F. (4.4° C.) until dry. Coating films that did not exhibit any cracking were determined to pass. Any cracking of the film was considered a failure.

Example 1

Preparation of Coalescent Compounds

Run 1. Preparation of Coalescent

Epsilon-caprolactone (2-oxepanone) (174 g), 1-dodecanol (173 g), and FASCAT 2003 (stannous octoate, available from Atofina Chemicals) (0.2 g) were charged to a 4-neck 500-mL round bottom flask fitted with mechanical stirring. The contents of the flask was heated to 150° C. and held until the free caprolactone level was below 0.5% as measured by GC (approximately four hours), then cooled to room temperature.

Runs 2-20. Preparation of Coalescents

A variety of coalescents were prepared following the procedure of Example 1, Run 1, with the exception that the 174 g caprolactone was varied according to the amount listed in Table 1A, and the 173 g of 1-dodecanol used in Example 1, Run 1 was replaced with the alcohol and amount listed in Table 1A.

TABLE 1A

| Run | Alcohol | caprolactone (grams)/ alcohol (grams) | Molar Ratio Caprolactone: Alcohol | % VOC |
|---|---|---|---|---|
| 1 | 1-dodecanol | 174/173 | 1.64:1 | 7.0% |
| 2 | 1-dodecanol | 200/163 | 2:1 | 6.0% |
| 3 | 1-dodecanol | 225/147 | 2.5:1 | 4.0% |
| 4 | 1-dodecanol | 240/130.5 | 3:1 | 3.0% |
| 5 | 1-dodecanol | 265/108 | 4:1 | 2.0% |
| 6 | benzyl alcohol | 228/108 | 2:1 | 9.0% |
| 7 | 2,2,4-trimethyl-1,3-pentane diol (TMPD) | 196/140 | 1.7:1 | 15% |
| 8 | 2-ethylhexanol, 2 mol EO | 157/200 | 1.5:1 | 10% |
| 9 | 2-amino-2-methyl-1-propanol (AMP-95) | 228/71.2 | 2.5:1 | 3.0% |
| 10 | 1-hexanol | 228/81.8 | 2.5:1 | 5.0% |
| 11 | 2-butoxyethanol (butyl cellosolve) | 228/94.4 | 2.5:1 | 8.0% |
| 12 | 1-butanol | 228/74.1 | 2.5:1 | 7.0% |
| 13 | 2(2-butoxyethoxy) ethanol (butyl carbitol) | 228/129.8 | 2.5:1 | 9.0% |
| 14 | 1-octanol | 228/104.2 | 2.5:1 | 5.0% |
| 15 | 2-propxyethanol (propyl cellosolve) | 228/83.2 | 2.5:1 | 9.0% |
| 16 | 1-propanol | 228/48 | 2.5:1 | 11.0% |
| 17 | 2-butyl-2ethyl-1,3 propanediol | 174/98 | 2.5:1 | 3.5% |
| 18 | 1,3-butanediol | 228/72 | 2.5:1 | 3.0% |
| 19 | 2-methoxyethanol (methyl cellosolve) | 228/60.8 | 2.5:1 | 7.0% |
| 20 | 2-ethoxyethanol (cellosolve) | 228/72.1 | 2.5:1 | 7.5% |

*TEXANOL is 99.5% VOC by this method

Example 2

Preparation of Coalescent Compounds

Run 1. Preparation of Coalescent from Cardura E10

CARDURA E10 (glycidyl ester of neodecanoic acid, available from Shell Chemical) (228 g) was charged to a 4-neck 500-mL round bottom flask equipped with mechanical stirring. The flask was heated to 140° C. and 88 g isobutyric acid was fed into the flask over 90 minutes. The contents of the flask were held at 140° C. for 2 hours and cooled to room temperature.

Runs 2–3. Preparation of Coalescents

A variety of coalescents were prepared following the procedure of Example 2, Run 1, with the exception that the 88 g of isobutyric acid used in Example 2, Run 1 was replaced with the acid listed in Table 2A.

TABLE 2A

| Run | Acid | Amount (Grams) | % VOC |
|---|---|---|---|
| 1 | Isobutyric acid | 88 | 7.0% |
| 2 | Acetic acid | 60 | 9.0% |
| 3 | Propionic acid | 74 | 10.0% |

Example 3

Preparation of Coating Compositions

Various coating compositions were prepared by mixing the ingredients listed in Table 3A. For each composition the coalescent is as described in Examples 1 and 2.

TABLE 3A

| Material | Description | Grams |
|---|---|---|
| Water | | 62.0 |
| Ethylene glycol | | 35.0 |
| AMP-95 | Amine, Angus | 1.0 |
| TAMOL 731 | Dispersant, Rohm & Haas | 10.0 |
| DEHYDRAN 1620 | Defoamer, Cognis | 1.0 |
| RCL-535 | TiO$_2$, Millennium | 245.0 |
| KATHON LX 1.5% | Biocide, Rohm & Haas | 1.7 |
| Emulsion polymer | | 453 |
| Ammonium hydroxide | | 2.0 |
| Coalescent | | 26.3 |
| Ethylene glycol | | 20.9 |
| SURFYNOL 504 | Surfactant, Air Products | 1.0 |
| ACRYSOL RM-2020NPR | Thickener, Rohm & Haas | 4.0 |
| ACRYSOL RM-6 | Thickener, Rohm & Haas | 31.0 |
| FOAMASTER SA-3 | Defoamer, Cognis | 3.5 |
| Water | | 156.0 |

TABLE 3B

| Example 1, Run | Alcohol | Molar Ratio Caprolactone: Alcohol | Scrub (relative to TEXANOL) | LTC |
|---|---|---|---|---|
| 1 | 1-dodecanol | 1.7:1 | 1.27 | Pass |
| 2 | 1-dodecanol | 2:1 | 1.09 | Pass |
| 3 | 1-dodecanol | 2.5:1 |  | Pass |
| 4 | 1-dodecanol | 3:1 | 1.07 | Pass |
| 5 | 1-dodecanol | 4:1 | 0.71 | Pass |
| 6 | Benzyl alcohol | 2:1 |  | Pass |
| 7 | 2,2,4-Trimethyl-1,3-pentane diol (TMPD) | 1.7:1 | 0.81 | Pass |
| 8 | 2-ethylhexanol, 2 mol EO | 1.5:1 | 0.96 | Pass |
| 9 | 2-amino-2-methyl-1-propanol (AMP-95) | 2.5:1 |  | Fail |
| 10 | 1-hexanol | 2.5:1 | 1.10 | Pass |
| 11 | 2-butoxyethanol (butyl cellosolve) | 2.5:1 | 1.35 | Pass |
| 12 | 1-butanol | 2.5:1 | 1.27 | Pass |
| 13 | 2(2-butoxyethoxy) ethanol (butyl carbitol) | 2.5:1 |  | Pass |
| 14 | 1-octanol | 2.5:1 |  | Pass |
| 15 | 2-propxyethanol (propyl cellosolve) | 2.5:1 |  | Pass |
| 16 | 1-propanol | 2.5:1 |  | Pass |
| 17 | 2-butyl-2ethyl-1,3 propanediol | 2.5:1 |  | Pass |
| 18 | 1,3-butanediol | 2.5:1 |  | Fail |
| 19 | 2-methoxyethanol (methyl cellosolve) | 2.5:1 |  | Pass |
| 20 | 2-ethoxyethanol (cellosolve) | 2.5:1 |  | Pass |

TEXANOL LTC: Pass, Scrub = 1.0

TABLE 3C

| Example 2, Run | Acid | LTC |
|---|---|---|
| 1 | Isobutyric acid | Pass |
| 2 | Acetic acid | Pass |
| 3 | Propionic acid | Pass |

TABLE 3D

| Example 3, Compound | VOC | LTC |
|---|---|---|
| Isodecyl benzoate | 15% | Pass |
| Bis(2-ethylhexyl) adipate | 0.6% | Pass |

Having thus described the preferred embodiments of the present invention, those skilled in the art will readily appreciate that the teachings found herein may be applied to yet other embodiments within the scope of the claims hereto attached. The complete disclosure of all patents, patent documents, and publications are incorporated herein by reference as if individually incorporated.

What is claimed is:

1. A coating composition, comprising:
   a latex polymer; and
   a coalescent having the formula:

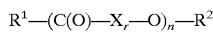

wherein:
   $R^1$ is an organic group;
   X is a divalent organic group;
   r is 0 to 1;
   n is 1 to 10; and
   $R^2$ is hydrogen or an organic group;
   with the proviso that $R^1$ includes at least three carbon atoms when X is not —$(CH_2)_s$— wherein s is 2 to 8;
   with the proviso that the coalescent has less than two aliphatic unsaturated carbon-carbon bonds when r is zero;
   wherein the coalescent has a volatile organic content of less than about 50% and is dispersible in the coating composition.

2. The coating composition of claim 1 wherein the coalescent does not phase separate from the coating composition upon standing at 49° C. for four weeks.

3. The coating composition of claim 1 wherein the coalescent does not include aliphatic unsaturated carbon-carbon bonds when r is zero.

4. The coating composition of claim 1 wherein the coalescent does not include aliphatic unsaturated carbon-carbon bonds.

5. The coating composition of claim 1, wherein r is one.

6. The coating composition of claim 1, wherein the coalescent facilitates the formation of polymer films of the latex polymer at a temperature of less than about 25° C.

7. The coating composition of claim 1, wherein the coalescent facilitates the formation of polymer films of the latex polymer at a temperature of about 4° C. to about 10° C.

8. The coating composition of claim 1, wherein the coalescent facilitates the formation of polymer films of the latex polymer at a temperature of about 4° C. to about 5° C.

9. The coating composition of claim 1, wherein the coalescent has a volatile organic content of less than about 30%.

10. The coating composition of claim 1, wherein the coalescent has a volatile organic content of less than about 20%.

11. The coating composition of claim 1, wherein the coalescent has a volatile organic content of less than about 15%.

12. The coating composition of claim 1, wherein the coalescent has a number average molecular weight of no greater than about 750.

13. The coating composition of claim 1, wherein the coalescent has a number average molecular weight of less than about 500.

14. The coating composition of claim 1, which is in the form of a paint.

15. The coating composition of claim 1, wherein n is 1 to 5.

16. The coating composition of claim 1, wherein n is 1 to 3.

17. The coating composition of claim 1, wherein n is 2 to 3.

18. The coating composition of claim 1, wherein $R^1$ is an organic group having less than 100 carbon atoms.

19. The coating composition of claim 1, wherein $R^1$ is an organic group having substituents selected from the group of oxygen atoms, carbonyl groups, hydroxyl groups, and combinations thereof.

20. The coating composition of claim 1, wherein $R^1$ is an organic group having 3 to 24 carbon atoms and substituents selected from the group of oxygen atoms, carbonyl groups, hydroxyl groups, and combinations thereof; and wherein $R^2$ is hydrogen.

21. The coating composition of claim 1, wherein $R^1$ has the formula $R^3$—$(CH_2)_m$—$(O(CH_2)_p)_q$— wherein $R^3$ is an alkyl or aryl group, m is 0 to 24, p is 1 to 4, and q is 0 to 50.

22. The coating composition of claim 14, wherein p is 1 to 2.

23. The coating composition of claim 14, wherein m+pq is less than about 23.

24. The coating composition of claim 1, wherein $R^2$ is hydrogen or an organic group having less than 100 carbon atoms.

25. The coating composition of claim 1, wherein X is a divalent organic group having 2 to 8 carbon atoms.

26. The coating composition of claim 1, wherein X is a divalent organic group having 3 to 5 carbon atoms.

27. The coating composition of claim 1, wherein X is an organic group having substituents selected from the group of oxygen atoms, carbonyl groups, and combinations thereof.

28. The coating composition of claim 1, wherein X has the formula —$(CH_2)_s$—, wherein s is 2 to 8.

29. A coating composition, comprising:
a latex polymer; and
a coalescent having the formula:

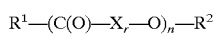

$R^1$—(C(O)—$X_r$—O)$_n$—$R^2$ wherein:
$R^1$ is an organic group;
X is a divalent organic group;
r is 0 to 1;
n is 1 to 10; and
$R^2$ is hydrogen or an organic group;
with the proviso that $R^1$ includes at least three carbon atoms when X is not —$(CH_2)_s$— wherein s is 2 to 8;
with the proviso that the coalescent does not includes aliphatic unsaturated carbon-carbon bonds;
with the proviso that r is one when $R^2$ is hydrogen;
wherein the coalescent has a volatile organic content of less than about 50%, is dispersible in the coating composition, and facilitates the formation of polymer films of the latex polymer at a temperature of less than about 25° C.

30. The coating composition of claim 29, wherein the coalescent facilitates the formation of polymer films of the latex polymer at a temperature of about 4° C. to about 10° C.

31. The coating composition of claim 29, wherein the coalescent facilitates the formation of polymer films of the latex polymer at a temperature of about 4° C. to about 5° C.

32. A coating composition, comprising:
a latex polymer; and
a coalescent having the formula:

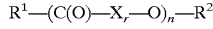

$R^1$—(C(O)—$X_r$—O)$_n$—$R^2$ wherein:
$R^1$ has the formula $R^3$—$(CH_2)_m$—$(O(CH_2)_p)_q$— wherein $R^3$ is an alkyl or aryl group, m is 0 to 24, p is 1 to 4, and q is 0 to 50;
X has the formula —$(CH_2)_s$—, wherein s is 2 to 8;
r is 0 to 1;
n is 1 to 10; and
$R^2$ is hydrogen or $R^1$;
wherein the coalescent has a volatile organic content of less than about 50%, is dispersible in the coating composition, and facilitates the formation of polymer films of the latex polymer at a temperature of less than about 25° C.

33. A coating composition, comprising:
a latex polymer; and
a coalescent having the formula:

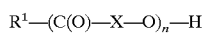

$R^1$—(C(O)—X—O)$_n$—H wherein:
$R^1$ is a hydrocarbyl moiety or an organic group containing substituents selected from the group of nonperoxidic oxygen atoms, hydroxyl groups, and combinations thereof;
X is a divalent hydrocarbyl moiety or an organic group containing nonperoxidic oxygen atoms and carbonyl groups; and
n is 1 to 10;
wherein the coalescent has a volatile organic content of less than about 50% and is dispersible in the coating composition.

34. The coating composition of claim 33, wherein the coalescent has a volatile organic content of less than about 30%.

35. A coating composition, comprising:
a latex polymer; and
a coalescent having the formula:

$R^1$—(C(O)—X—O)$_n$—H wherein:
$R^1$ is a hydrocarbyl moiety or an organic group containing substituents selected from the group of nonperoxidic oxygen atoms, hydroxyl groups, and combinations thereof;
X has the formula —$(CH_2)_s$—, wherein s is 2 to 8; and
n is 1 to 10;
wherein the coalescent has a volatile organic content of less than about 50% and is dispersible in the coating composition.

36. The coating composition of claim 35 wherein s is 3 to 5.

37. The coating composition of claim 30, wherein the coalescent has a volatile organic content of less than about 30%.

38. A coating composition, comprising:
a latex polymer; and
a coalescent having the formula:

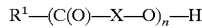

$R^1$—(C(O)—X—O)$_n$—H wherein:
$R^1$ is a hydrocarbyl moiety or an organic group containing nonperoxidic oxygens;
X is an organic group containing nonperoxidic oxygens and carbonyl groups; and
n is 1 to 10;
wherein the coalescent has a volatile organic content of less than about 50% and is dispersible in the coating composition.

39. The coating composition of claim 38, wherein the coalescent has a volatile organic content of less than about 30%.

40. The coating composition of claim 1, which has been coated onto a substrate and dried.

41. The coating composition of claim 29, which has been coated onto a substrate and dried.

42. The coating composition of claim 32, which has been coated onto a substrate and dried.

43. The coating composition of claim 33, which has been coated onto a substrate and dried.

44. The coating composition of claim 35, which has been coated onto a substrate and dried.

45. The coating composition of claim 38, which has been coated onto a substrate and dried.

* * * * *

UNITED STATES PATENT AND TRADEMARK OFFICE
CERTIFICATE OF CORRECTION

PATENT NO. : 6,762,230 B2  
DATED : July 13, 2004  
INVENTOR(S) : Brandenburger et al.

It is certified that error appears in the above-identified patent and that said Letters Patent is hereby corrected as shown below:

Title page,
Item [75], Inventors, delete "Mary Jane Owens" and insert -- Mary Jane Hibben --

Signed and Sealed this

Sixteenth Day of November, 2004

JON W. DUDAS  
*Director of the United States Patent and Trademark Office*